(12) United States Patent
Shi et al.

(10) Patent No.: US 11,200,043 B2
(45) Date of Patent: Dec. 14, 2021

(54) ANALYZING SOFTWARE CHANGE IMPACT BASED ON MACHINE LEARNING

(71) Applicant: International Business Machines Corporation, Armonk, NY (US)

(72) Inventors: Hui Qing Shi, Beijing (CN); Yi Bin Wang, Beijing (CN); Yuan Yuan, Beijing (CN); Ya Pei Zhou, Beijing (CN); Wei Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 16/049,083

(22) Filed: Jul. 30, 2018

(65) Prior Publication Data
US 2020/0034135 A1    Jan. 30, 2020

(51) Int. Cl.
| G06F 9/44 | (2018.01) |
| G06F 8/65 | (2018.01) |
| G06N 5/04 | (2006.01) |
| G06N 20/00 | (2019.01) |
| G06F 16/21 | (2019.01) |

(52) U.S. Cl.
CPC .............. G06F 8/65 (2013.01); G06F 16/219 (2019.01); G06N 5/04 (2013.01); G06N 20/00 (2019.01)

(58) Field of Classification Search
CPC ......... G06F 8/65; G06F 16/219; G06N 20/00; G06N 5/04
See application file for complete search history.

(56) References Cited

U.S. PATENT DOCUMENTS

| 9,372,685 | B1* | 6/2016 | Luettge ................... G06F 8/656 |
| 9,703,543 | B2 | 7/2017 | Satish et al. |
| 2004/0210653 | A1 | 10/2004 | Kanoor et al. |
| 2005/0021276 | A1* | 1/2005 | Southam ................ H04L 43/50 702/122 |
| 2006/0130040 | A1 | 6/2006 | Subramanian et al. |
| 2007/0150815 | A1* | 6/2007 | Smith ..................... G06F 9/445 715/733 |
| 2014/0143756 | A1* | 5/2014 | Liang ....................... G06F 8/70 717/120 |
| 2014/0201115 | A1 | 7/2014 | Berndt et al. |
| 2015/0082293 | A1* | 3/2015 | Thomas .............. G06F 11/3672 717/168 |
| 2016/0380817 | A1* | 12/2016 | Agarwal .................. G06F 8/10 709/221 |
| 2019/0026108 | A1* | 1/2019 | Byrd ......................... G06F 8/77 |
| 2019/0079850 | A1* | 3/2019 | Zhang ....................... G06F 8/34 |
| 2019/0243617 | A1* | 8/2019 | Stevens .................... G06F 8/42 |

OTHER PUBLICATIONS

Mell et al., "The NIST Definition of Cloud Computing," National Institute of Standards and Technology Special Publication 800-145, Sep. 2011, 7 pages.

* cited by examiner

*Primary Examiner* — Chat C Do
*Assistant Examiner* — Lenin Paulino
(74) *Attorney, Agent, or Firm* — Yee & Associate, P.C.

(57) ABSTRACT

Analyzing software change impact is provided. Feedback is received regarding a predicted impact of a software change to a set of components of a service. It is determined whether the predicted impact of the software change is correct based on the feedback. In response to determining that the predicted impact of the software change is correct based on the feedback, the software change is applied to the set of components of the service increasing performance of the service and a server computer hosting the service.

18 Claims, 14 Drawing Sheets

ANALYZING SOFTWARE CHANGE IMPACT BASED ON MACHINE LEARNING

BACKGROUND

1. Field

The disclosure relates generally to cloud services and more specifically to measuring and analyzing impact of a software change on a set of one or more components of a cloud service and related services based on machine learning.

2. Description of the Related Art

Cloud computing enables ubiquitous access to shared pools of configurable system resources and higher-level services that can be rapidly provisioned with minimal management effort, often over the Internet. Third-party clouds enable organizations to focus on their core business instead of expending resources on computer infrastructure and maintenance. A goal of cloud computing is to allow users to benefit from these shared resources, without deep knowledge about or expertise with each one of them.

The main enabling technology for cloud computing is virtualization. Virtualization software separates a physical computing device into one or more "virtual" devices, each of which can be easily used and managed to perform computing tasks. Cloud computing provides all of its resources as services and makes use of well-established standards and best practices gained in the domain of service-oriented architecture to allow easy global access to cloud services in a standardized way.

Nowadays, cloud computing is very popular. Typically, a cloud computing platform is managed by a cloud service provider. Related software are key components of a cloud computing platform. Each software component has a life-cycle. The stability of a cloud computing platform depends on the stability of the related software components. It is common practice for cloud service providers to update patch and/or upgrade software components to fix bugs and/or add new functions and features.

SUMMARY

According to one illustrative embodiment, a computer-implemented method for analyzing software change impact is provided. A computer receives feedback regarding a predicted impact of a software change to a set of components of a service. The computer determines whether the predicted impact of the software change is correct based on the feedback. In response to the computer determining that the predicted impact of the software change is correct based on the feedback, the computer applies the software change to the set of components of the service increasing performance of the service and a server computer hosting the service. According to other illustrative embodiments, a computer system and computer program product for analyzing software change impact are provided.

DETAILED DESCRIPTION

Figure 1:
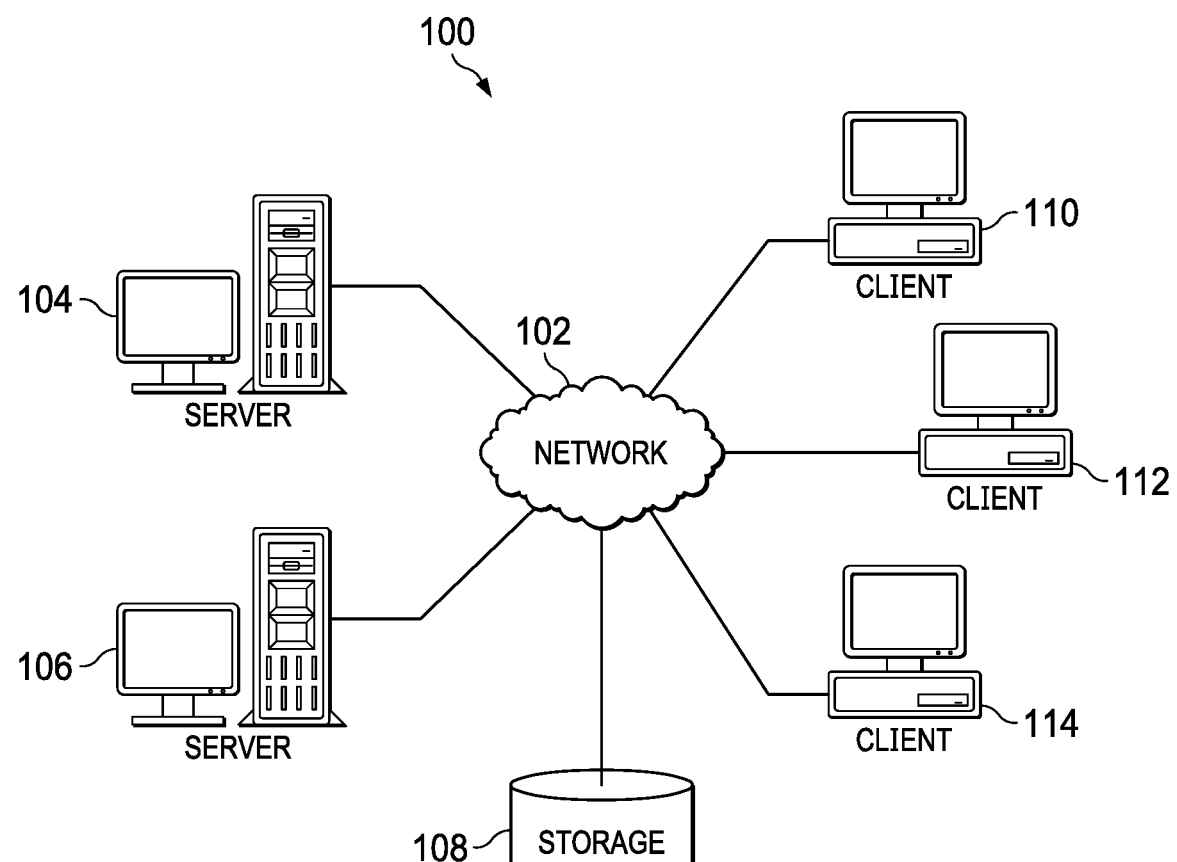
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, it should be noted that server 104 and server 106 may each represent multiple computing nodes in a cloud environment. Alternatively, server 104 and server 106 may each represent a cluster of servers in one or more data centers.

Also in the depicted example, server 104 provides a service to registered client devices. The service may be any type of service, such as, for example, a banking service, a financial service, a streaming data service, an educational service, a data storage service, a search service, a gaming service, and the like. Server 106 provides a software change management service to server 104. For example, if server 104 requires a software upgrade or bug fix for the service provided by server 104, then server 106 predicts the impact of the software change on one or more components, such as hardware, middleware, operating systems, applications, and the like, of server 104 based on analyzing same or similar stored historic software change impact data and/or utilizing a stored software change impact evaluation model. Then, server 106 determines whether to automatically apply the software change based on analyzing the historic software change impact data and/or utilizing the stored software change impact evaluation model.

Client 110, client 112, and client 114 also connect to network 102. Clients 110 and 112 may be, for example, clients of server 104. Users of clients 110 and 112 may utilize clients 110 and 112 to access the services provided by server 104. Client 114 may be, for example, a client of server 106. A user, such as, for example, a system administrator, may utilize client 114 to access the software change management service provided by server 106 to manually implement a software change and/or provide feedback regarding a real impact of the software change on components of server 104.

In this example, clients 110, 112, and 114 are shown as desktop or personal computers with wire communication links to network 102. However, it should be noted that clients 110, 112, and 114 are meant as examples only. In other words, clients 110, 112, and 114 may represent other types of data processing systems, such as, for example, network computers, laptop computers, handheld computers, smart phones, smart watches, smart televisions, gaming systems, and the like.

Storage 108 is a network storage device capable of storing any type of data in a structured or unstructured format. In addition, storage 108 may represent a plurality of network storage devices. Further, storage 108 may store identifiers and network addresses for a plurality of client devices, identifiers for a plurality of client device users, identifiers and network addresses for a plurality of servers providing a plurality of different services, identifiers for the plurality of different services, software change history data, software change impact evaluation models, and the like. Furthermore, storage unit 108 may store other types of data, such as authentication or credential data that may include user names, passwords, and biometric data associated with client device user and system administrators, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 106 and downloaded to server 104 and client 114 over network 102 for use on server 104 and client 114.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

Figure 2:
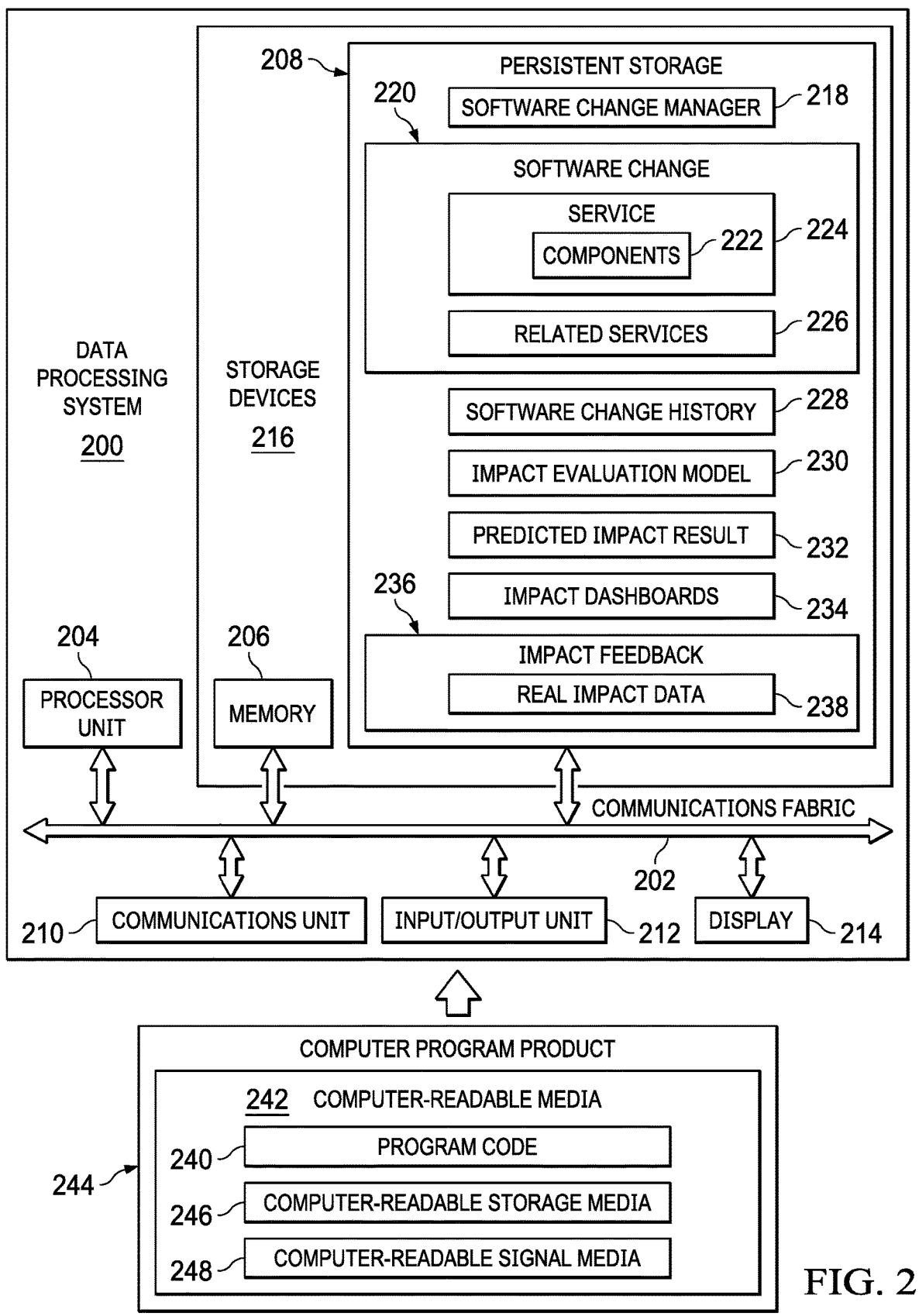
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 106 in FIG. 1, in which computer readable program code or instructions implementing processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores software change manager 218. However, it should be noted that even though software change manager 218 is illustrated as residing in persistent storage 208, in an alternative illustrative embodiment software change manager 218 may be a separate component of data processing system 200. For example, software change manager 218 may be a hardware component coupled to communication fabric 202 or a combination of hardware and software components. In another alternative illustrative embodiment, a first portion of software change manager 218 may be located in data processing system 200 and a second portion of software change manager 218 may be located in a second data processing system, such as, for example, server 104 in FIG. 1, which provides a service to registered clients. In yet another alternative illustrative embodiment, software change manager 218 may be located in the server providing the service to registered clients, in addition to or instead of, data processing system 200.

Software change manager 218 controls the process of predicting impact of software change 220 on one or more components 222 of service 224, which is hosted by another computing platform. Software change 220 may represent a software upgrade or bug fix, for example. Components 222 may represent any type of component, such as, for example, hardware, middleware, operating systems, applications, and the like, associated with service 224. Service 224 may represent any type of cloud service. In addition, software change manager 218 predicts the impact of software change 220 on related services 226. Related services 226 represent cloud services that are related to service 224 via a cloud service reticular structure.

Software change manager 218 utilizes software change history 228 and/or impact evaluation model 230 to generate predicted impact result 232 of software change 220. Software change history 228 represents a data structure that contains previously recorded software changes to different service components. Impact evaluation model 230 represents a stored model for analyzing impact of software changes on the different service components. Impact evaluation model 230 may include, for example, a software change impact table that contains values and associated weights for a plurality of impact factors corresponding to software change 220 and a software change recommendation table that contains points and associated weights for a plurality of install recommendation factors corresponding to software change 220. Predicted impact result 232 represents a predicted impact of software change 220 on one or more components of service 224.

Software change manager 218 generates impact dashboards 234 based on predicted impact result 232. Impact dashboards 234 represent a set of one or more interactive dashboards that a user, such as a system administrator, may review to provide impact feedback 236 regarding predicted impact result 232. Impact dashboards 234 may include, for example, a software change impact overview dashboard, services impacted by software change 220 dashboard, an impact map for software change 220 dashboard, an impact of different software changes dashboard, and the like. Impact feedback 236 includes real impact data 238. Real impact data 238 represent information regarding a real impact, as opposed to a predicted impact, of software change 220 on one or more components of service 224. Real impact data 238 may be input by the system administrator or may be automatically generated by software change manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 240 is located in a functional form on computer readable media 242 that is selectively removable and may be loaded onto or transferred to data processing system 200 for running by processor unit 204. Program code 240 and computer readable media 242 form computer program product 244. In one example, computer readable media 242 may be computer readable storage media 246 or computer readable signal media 248. Computer readable storage media 246 may include, for example, an optical or magnetic disc that is inserted or placed into a drive or other device that is part of persistent storage 208 for transfer onto a storage device, such as a hard drive, that is part of persistent storage 208. Computer readable storage media 246 also may take the form of a persistent storage, such as a hard drive, a thumb drive, or a flash memory that is connected to data processing system 200. In some instances, computer readable storage media 246 may not be removable from data processing system 200.

Alternatively, program code 240 may be transferred to data processing system 200 using computer readable signal media 248. Computer readable signal media 248 may be, for example, a propagated data signal containing program code 240. For example, computer readable signal media 248 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 240 may be downloaded over a network to persistent storage 208 from another device or data processing system through computer readable signal media 248 for use within data processing system 200. For instance, program code stored in a computer readable storage media in a data processing system may be downloaded over a network from the data processing system to data processing system 200. The data processing system providing program code 240 may be a server computer, a client computer, or some other device capable of storing and transmitting program code 240.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 246 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It is understood that although this disclosure includes a detailed description on cloud computing, implementation of the teachings recited herein is not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
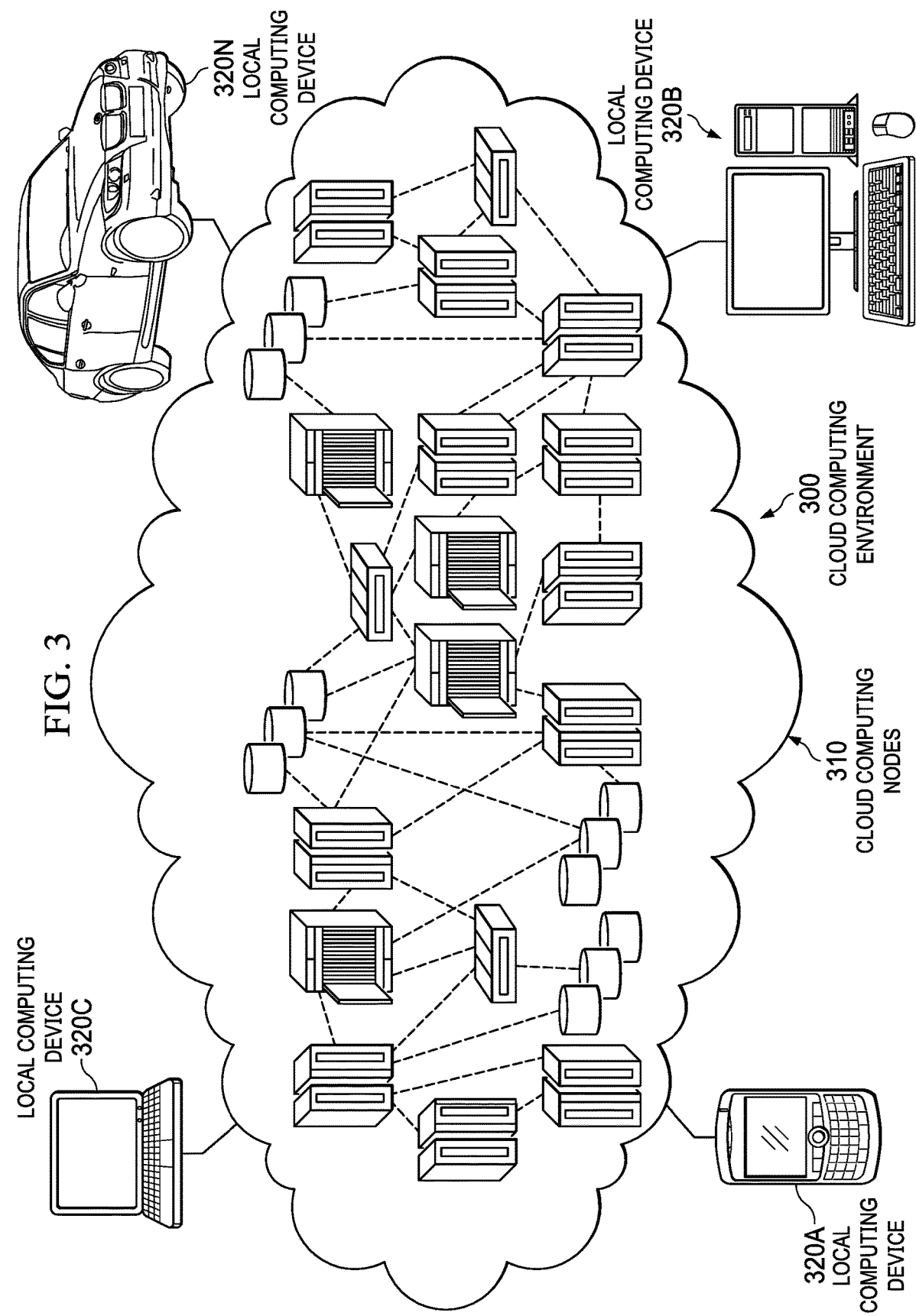
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or a smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
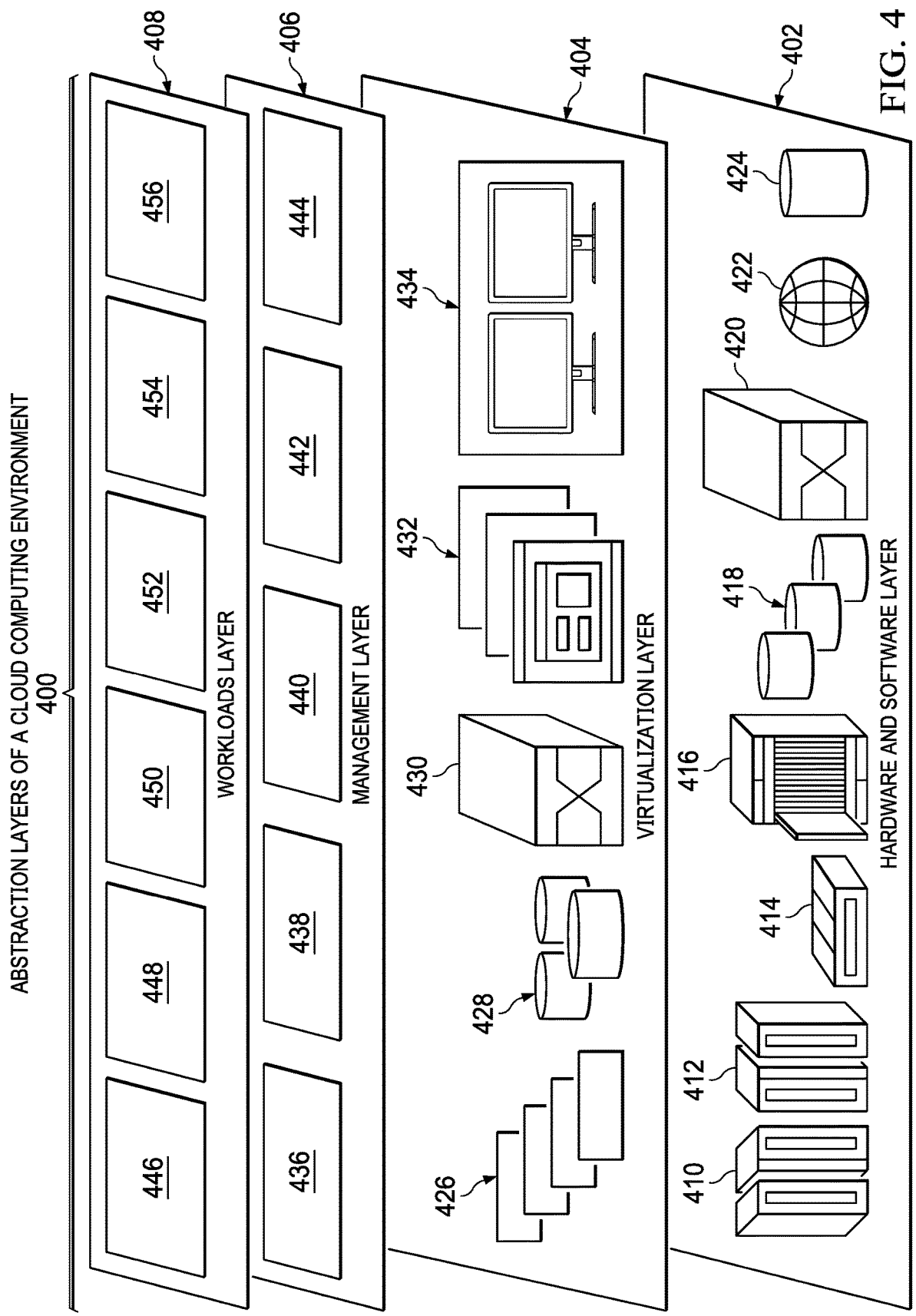
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workloads layer 408, may include mapping and navigation 446, software development and lifecycle management 448, virtual classroom education delivery 450, data analytics processing 452, transaction processing 454, and service software change analytics processing 456.

In the current fluid software development era, cloud service providers are performing software changes, such as software upgrades and software bug fix packs, with increased frequency. However, evaluating the impact of these software changes on cloud services is a challenge for these cloud service providers. To address and take into account this challenge, illustrative embodiments provide a machine learning-based method to measure and evaluate the impact of software changes on components of cloud computing platforms. Illustrative embodiments may apply to any type of software change, which may include any code or configuration applied to hardware (e.g., servers, routers, storage devices, switches, and the like), middleware, operating systems, applications, or the like, in order to add new features and functions, fix software issues and bugs, meet security compliance requirements, and improve the stability and performance of the cloud computing platforms. A cloud management service of illustrative embodiments may include a plurality of modules, such as, for example, a change information manager module, a software change impact history analysis module, an impact analysis without history module, an impact analysis with history module, a real impact manager module, an impact evaluation model training and optimization module, and an applied software change real impact result report module.

Figure 5:
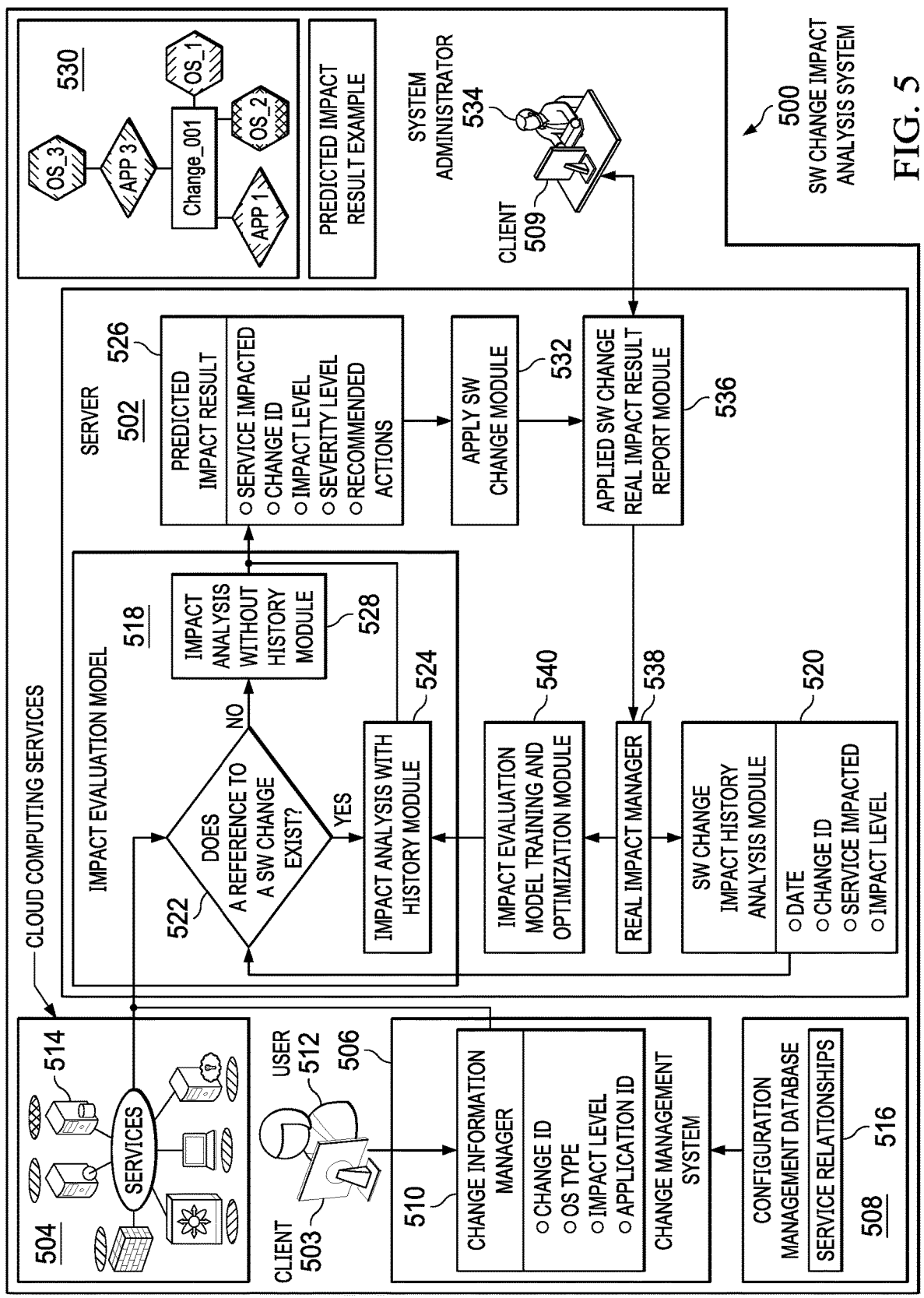
FIG. 5 is a diagram illustrating a software change impact analysis system in accordance with an illustrative embodiment.

With reference now to FIG. 5, a diagram illustrating a software change impact analysis system is depicted in accordance with an illustrative embodiment. Software change impact analysis system 500 may be implemented in a network of data processing systems, such as network data processing system 100 in FIG. 1. Software change impact analysis system 500 analyzes and manages the impact of a software change on one or more components of a cloud service and related cloud services.

In this example, software change impact analysis system 500 includes server 502, client 503, cloud computing services 504, change management system 506, configuration management database 508, and client 509. However, it should be noted that software change impact analysis system 500 may include any number of servers, clients, cloud computing services, and other data processing systems not shown. Also, it should be noted that change management system 506 and/or configuration management database 508 may be included in server 502. Server 502 may be, for example, server 106 in FIG. 1, data processing system 200 in FIG. 2, or a cloud computing node in cloud computing nodes 310 in FIG. 3. Clients 503 and 509 may be, for example, clients 110 and 114 in FIG. 1. Cloud computing services 504 represent a plurality of different services provided by a plurality of different cloud computing platforms.

Server 502 receives software change information, such as, for example, a software change identifier, an operating system type, an impact level, an application identifier, and the like, from change information manager 510 of change management system 506. However, it should be noted that server 502, itself, may automatically generate the software change information. In this example, user 512 inputs the software change information corresponding to the service provided by cloud computing platform 514 into change information manager 510 using client 503. It should be noted that the service provided by cloud computing platform 514 is indicated as needing a software change.

In addition, change information manager 510 retrieves service relationships 516 from configuration management database 508, which may be a central repository, such as a central configuration management database repository for cloud services, and sends service relationships 516 to server 502. Service relationships 516 identify relationships between the different cloud services of cloud computing services 504. Server 502 uses the software change and service relationships information provided by change information manager 510 to generate software change impact evaluation model 518. Software change impact evaluation model 518 may be, for example, impact evaluation model 230 in FIG. 2.

Further, server 502 uses software change impact history analysis module 520 to detect same or similar historical software change data in a software change history data structure based on the software change information provided by change information manager 510. Furthermore, at 522, server 502 makes a determination as to whether same or similar historical software change data exists in the software change history data structure. If server 502 determines that a reference to same or similar historical software change data exists in the software change history data structure for the software change to the service provided by cloud computing platform 514, then server 502 uses impact analysis with history module 524 to calculate predicted impact result 526 corresponding to the software change based on the same or similar historical software change data. Alternatively, if server 502 determines that no reference to same or similar historical software change data exists in the software change history data structure, then server 502 uses impact analysis without history module 528 to calculate predicted impact result 526 corresponding to the software change based on software change impact evaluation model 518 that includes a software change impact table of software change impact factors with associated values and weights and a software change recommendation table of install recommendation factors with associated points and weights.

Predicted impact result 526 may be, for example, predicted impact result 232 in FIG. 2. In this example, predicted impact result 526 includes identifiers for one or more services impacted by the software change, a software change identifier, an impact level corresponding to the software change, a severity level corresponding to the software change, and recommended action steps corresponding to the software change. Predicted impact result example 530 represents an example of a predicted impact of the software change. For example, predicted impact result example 530 illustrates that server 502 predicts that software change_001 will have a minimal to no impact on application (App) 3 and operating system (OS)_3, a moderate impact on App 1 and OS_1, and a severe or critical impact on OS_2.

In response to server 502 automatically applying the software change via apply software change module 532 or system administrator 534 via client 509 manually directing apply software change module 532 to implement the software change, server 502 uses applied software change real impact result report module 536 to generate a real impact result report corresponding to the software change. It should be noted that system administrator 534 and client 509 may be the same as user 512 and client 503 or different from user 512 and client 503. Also, system administrator 534 via client 509 provides feedback regarding the real impact of the software change to applied software change real impact result report module 536 for inclusion in the real impact result report. In addition, applied software change real impact result report module 536 compares predicted impact result 526 of the software change with the real impact result of the software change to determine whether the predicted impact result was accurate or not.

Applied software change real impact result report module sends the real impact result report to real impact manager 538 for processing and analysis. In turn, real impact manager 538 feeds the processed and analyzed real impact data into software change impact history analysis module 520 for recordation in the software change history data structure and into impact evaluation model training and optimization module 540 to optimize software change impact evaluation model 518 via machine learning and historical software change data similarity analysis.

Figure 6:
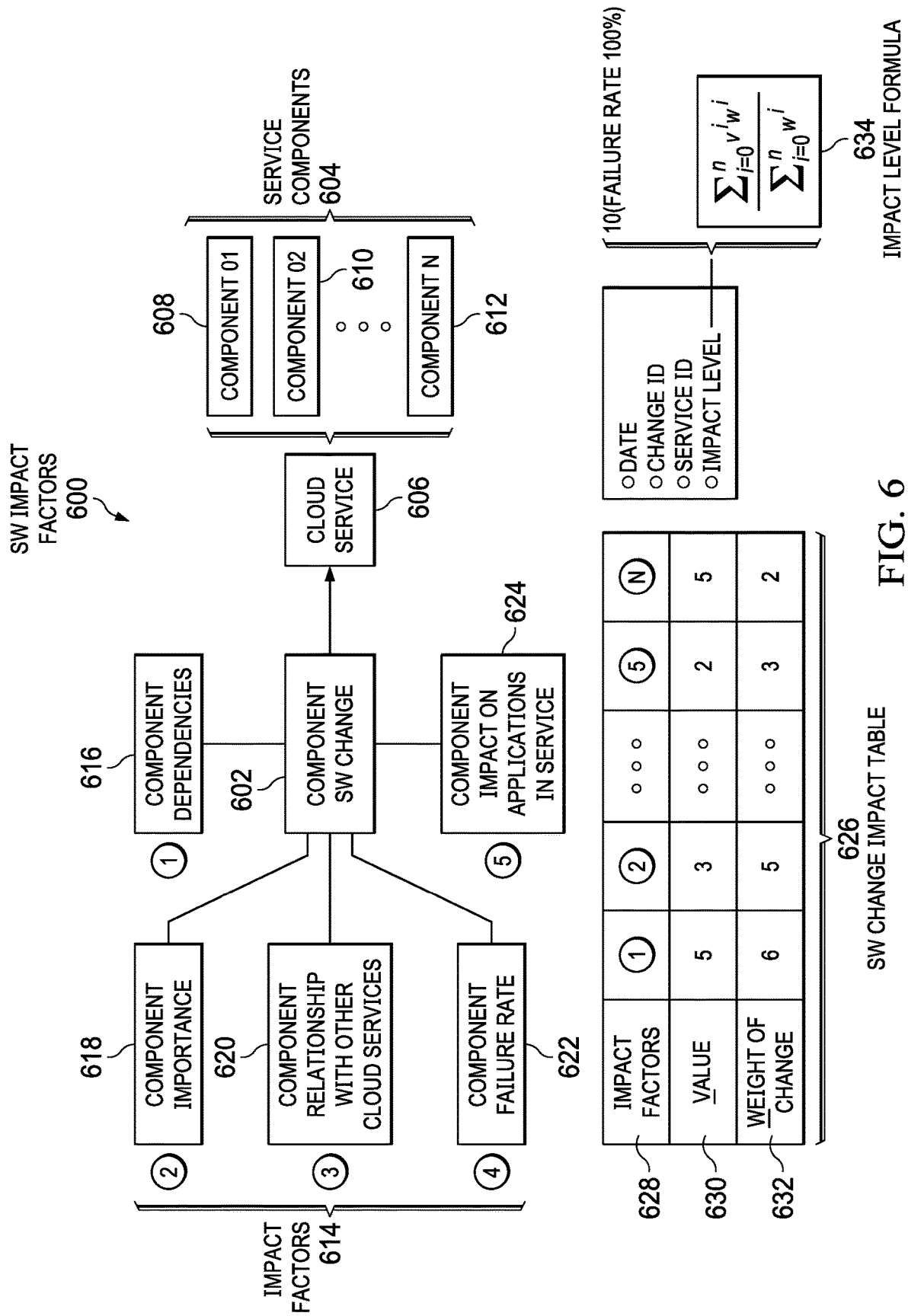
FIG. 6 is a diagram illustrating service impact factors in accordance with an illustrative embodiment.

With reference now to FIG. 6, a diagram illustrating service impact factors is depicted in accordance with an illustrative embodiment. Service impact factors 600 represent a plurality of different factors that contribute to the impact of component software change 602. Component software change 602 may be, for example, software change 220 in FIG. 2. Component software change 602 represents a software change to one or more components in service components 604, which comprise cloud service 606. Service components 604 may include hardware components, middleware components, operating system components, application components, and the like. In this example, service components 604 include component_01 608, component_02 610, to component_N 612. In other words, service components 604 may include any number of components.

Also in this example, impact factors 614 include component dependencies 616, component importance 618, component relationship with other cloud services 620, component failure rate 622, and component impact on applications in service 624. Component dependencies 616 represent a set of one or more dependencies that the component directly affected by the software change has with other components of service components 604. Component importance 618 represents a level of importance or criticality of the component directly affected by the software change has with cloud service 606. Component relationship with other cloud services 620 represents one or more relationships that the component directly affected by the software change has with one or more other cloud services. Component failure rate 622 represents a rate of failure associated with the component directly affected by the software change. Component impact on applications in service 624 represents the impact of the component directly affected by the software change on applications in cloud service 606.

A software change manager, such as, for example, software change manager 218 in FIG. 2, utilizes software change impact table 626 to calculate the level of impact of the software change on one or more of service components 604 of cloud service 606. In this example, software change impact table 626 includes impact factors 628, value 630, and weight of change 632. It should be noted that impact factors 628 correspond to impact factors 614 using corresponding numbers, such as 1, 2, 3, 4, and 5.

Value 630 represents a numerical value assigned to each impact factor in impact factors 628. For example, value 630 for component dependencies 616 has a numerical value of 5, whereas value 630 for component importance 618 has as numerical value of 3. Weight of change 632 represents a numerical value that value 630 is multiplied by to adjust the significance of value 630 in calculating the level of impact of component software change 602. In this example, weight of change 632 for component dependencies 616 has a numerical value of 6, whereas weight of change 632 for component importance 618 has a numerical value of 5. In other words, in this example, component dependencies 616 have a greater significance in calculating the level of impact of component software change 602 on service components 604, whereas component importance 618 has a lesser significance. It should be noted that 10 represents a maximum numerical value for value 630 and weight of change 632. For example, if component failure rate 622 is 100%, then the impact level is 10 for that impact factor.

Illustrative embodiments input the data from software change impact table 626 into impact level formula 634 to calculate the impact level of component software change 602. For example, in accordance with impact level formula

634: each factor's weight is multiplied by the value's sum, divided by each factor's weight's sum. Thus, illustrative embodiments may determine and measure the impact level of component software change 602 on one or more components of cloud service 606.

Figure 7:
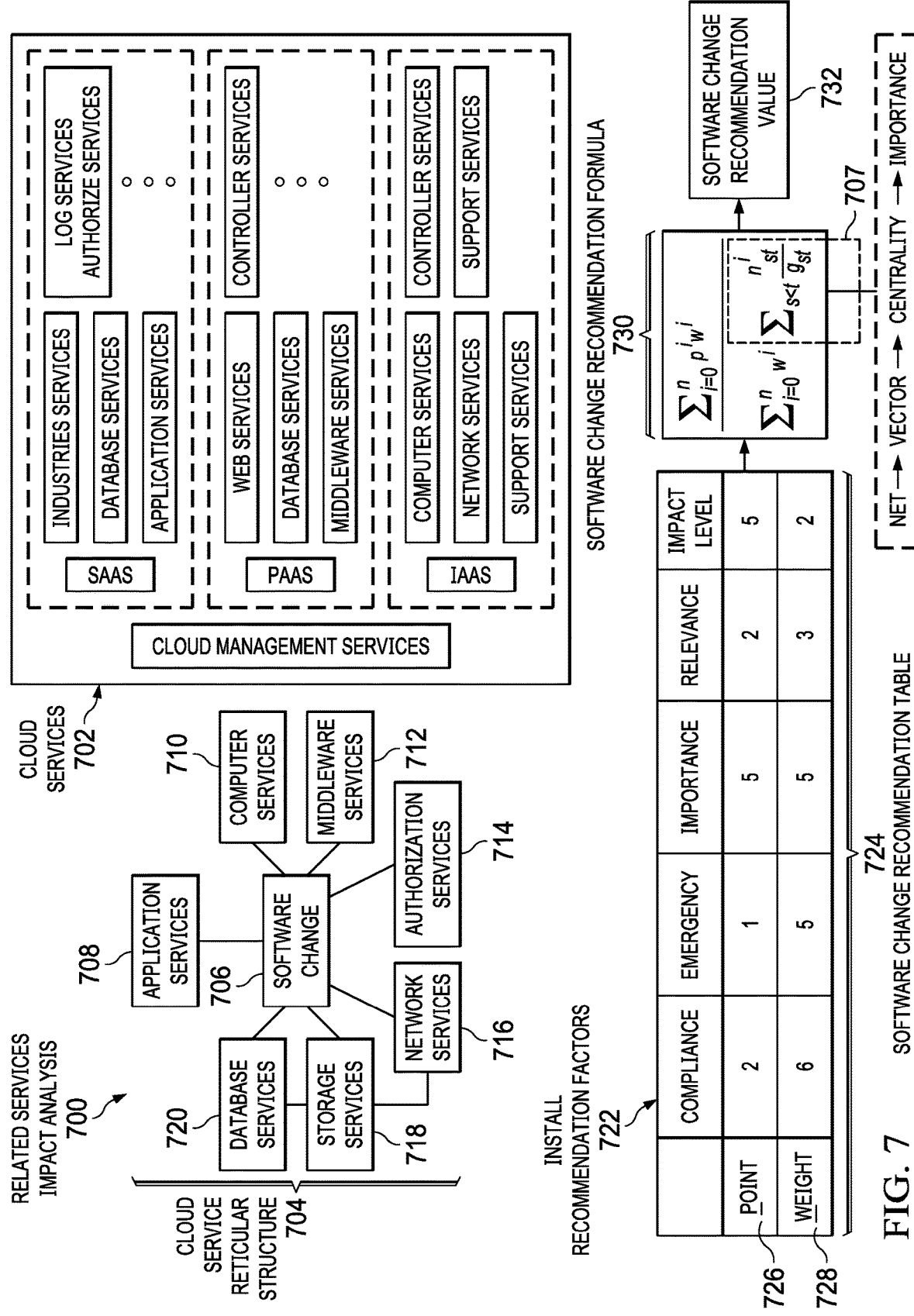
FIG. 7 is a diagram illustrating related services impact analysis in accordance with an illustrative embodiment.

With reference now to FIG. 7, a diagram illustrating related services impact analysis is depicted in accordance with an illustrative embodiment. Related services impact analysis 700 corresponds to cloud services 702. In this example, cloud services 702 include SaaS, PaaS, and IaaS, which are a combination of multiple services, such as database services, application services, web services, middleware services, computer services, network services, storage services, and the like. Further, illustrative embodiments subdivide each service to generate cloud service reticular structure 704.

Illustrative embodiments calculate a service importance score for each service in cloud service reticular structure 704. The cloud service importance score represents a degree of importance associated with each service in cloud services reticular structure 704. Illustrative embodiments identify each service in cloud services reticular structure 704 affected by software change 706 and calculate their degree of importance (i.e., service importance score) in accordance with service importance score formula 707. In this example, cloud services reticular structure 704 includes application services 708, computer services 710, middleware services 712, authorization services 714, network services 716, storage services 718, and database services 720.

Illustrative embodiments recommend installation of software change 706 based on a plurality of factors, such as install recommendation factors 722, which are listed in software change recommendation table 724. In this example, install recommendation factors 724 include compliance, emergency, importance, relevance, and impact level. However, it should be noted that alternative illustrative embodiments may include more or fewer install recommendation factors than illustrated. Illustrative embodiments set for each factor affected by software change 706, a point value and an associated weight, such as point 726 and weight 728. It should be noted that 10 is a maximum numerical value for point 726. A smaller point value represents a higher degree of compliance, a higher degree of emergency, a higher degree of importance, a higher degree of relevance, and a higher impact level. In contrast, a higher point value represents a lesser degree of compliance, a lesser degree of emergency, a lesser degree of importance, a lesser degree of relevance, and a lesser impact level. In addition, 10 is a maximum numerical value for weight 728. It should be noted that illustrative embodiments may automatically adjust weights over time via machine learning.

Illustrative embodiments utilize software change recommendation formula 730 to calculate software change recommendation value 732. Software change recommendation value 732 is each factor's weight multiplied by the value's sum, divided by each factor's weight's sum and each service's importance score sum. A smaller value for software change recommendation value 732 represents less adverse consequences by software change 706 and a higher recommendation for implementation of software change 706. Conversely, a higher value for software change recommendation value 732 represents more adverse consequences caused by software change 706 and a lower recommendation for implementation of software change 706.

Figure 8:
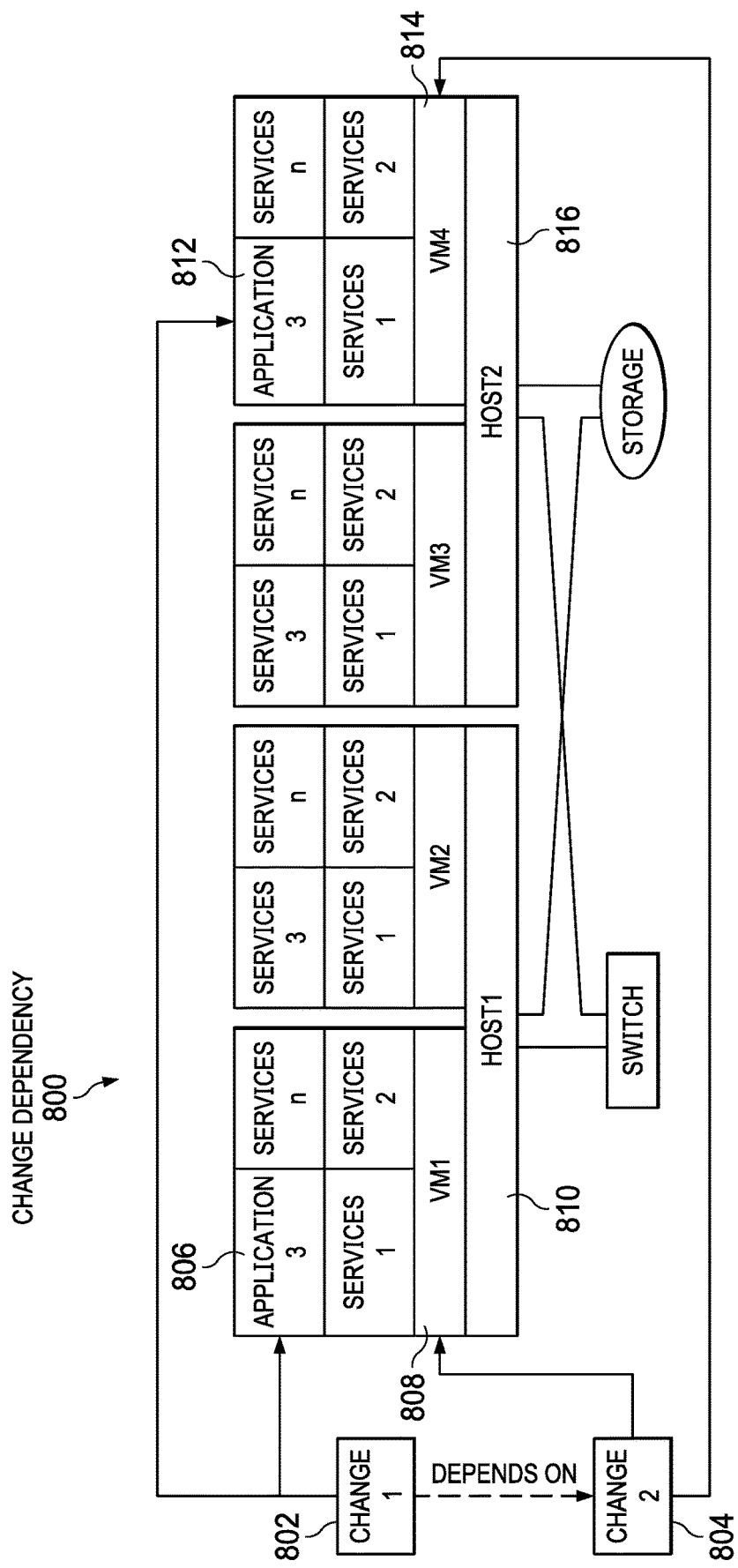
FIG. 8 is a diagram illustrating software change dependencies in accordance with an illustrative embodiment.

With reference now to FIG. 8, a diagram illustrating software change dependencies is depicted in accordance with an illustrative embodiment. Software change dependencies 800 illustrate that change 1 802 depends on change 2 804. For example, when illustrative embodiments want to implement change 1 802 on application 3 806 of virtual machine (VM)1 808, which is local on Host1 810, illustrative embodiments utilize a software change impact history analysis module, such as, for example, software change impact history analysis module 520 in FIG. 5, to analyze which services will be affected by change 1 802. In this example, the software change impact history analysis module determines that illustrative embodiments need to implement change 2 804 before implementing change 1 802 due to dependence. In addition, change 2 804 will impact application 3 812 of VM4 814, which is local on Host2 816. This means that when change 1 802 will be implemented on VM4 814, change 2 804 needs to be implemented first.

Figure 9:
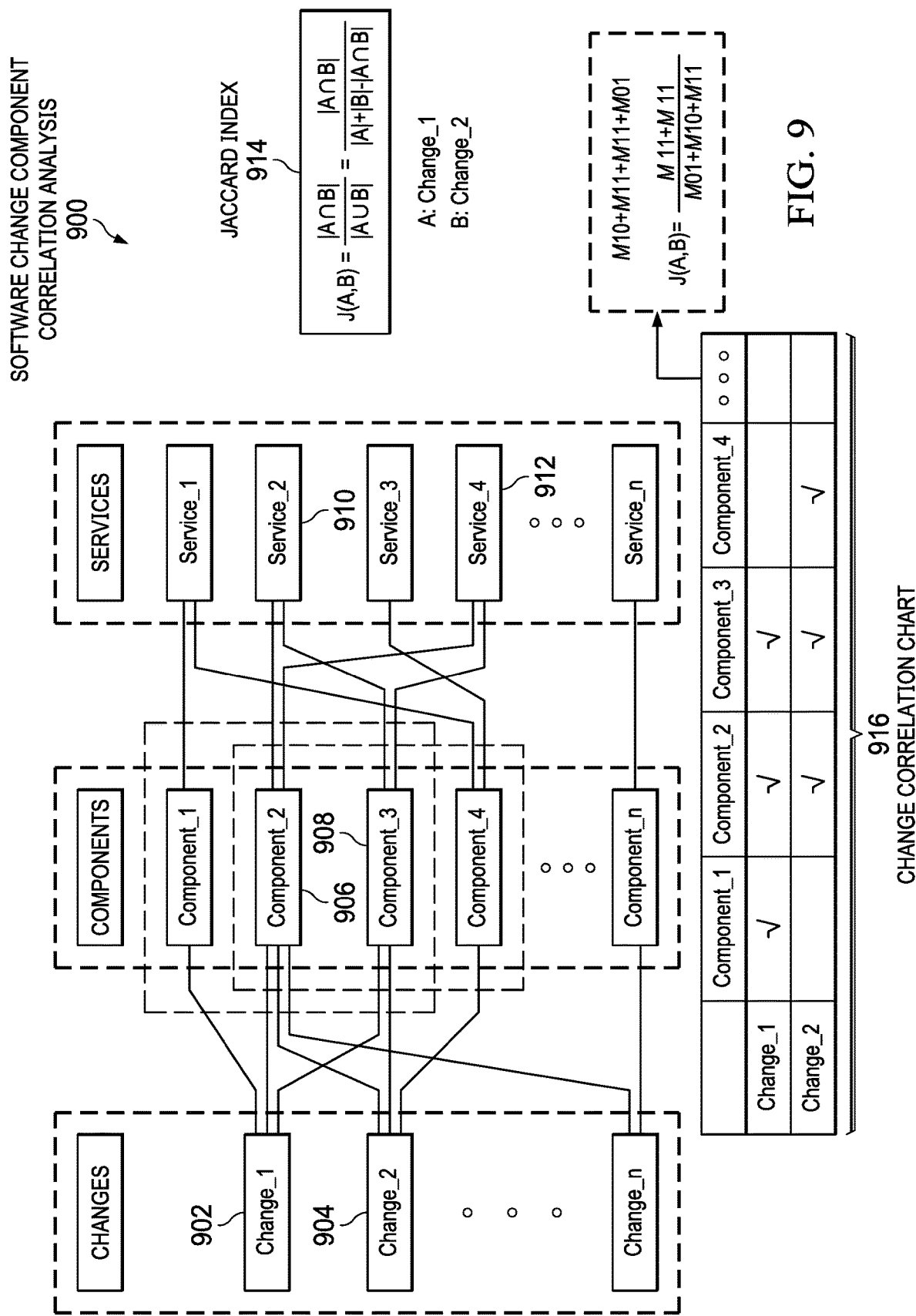
FIG. 9 is a diagram illustrating software change component correlation analysis in accordance with an illustrative embodiment.

With reference now to FIG. 9, a diagram illustrating software change component correlation analysis is depicted in accordance with an illustrative embodiment. Software change component correlation analysis 900 determines similarity between or among software changes by comparing related components of corresponding services. In this example, software change component correlation analysis 900 determines similarity between software change 1 902 and software change 2 904. Also, it should be noted that software change 1 902 and software change 2 904 will be implemented on multiple components, which are part of different services.

First, software change component correlation analysis 900 identifies and compares the components that are affected by software change 1 902 and software change 2 904. For example, software change 1 902 and software change 2 904 will be implemented on some of the same components (i.e., component 2 906 and component 3 908, which correspond to service 2 910 and service 4 912). Based on this relationship, illustrative embodiments define software change 1 902 and software change 2 904 as same or similar software changes. As a result, illustrative embodiments can determine similarity between/among software changes by comparing related components of corresponding services. Software change component correlation analysis 900 utilizes Jaccard index 914 to identify similarities between software change 1 902 and software change 2 904. Change correlation chart 916 illustrates the correlation between software change 1 902 and software change 2 904.

Figure 10:
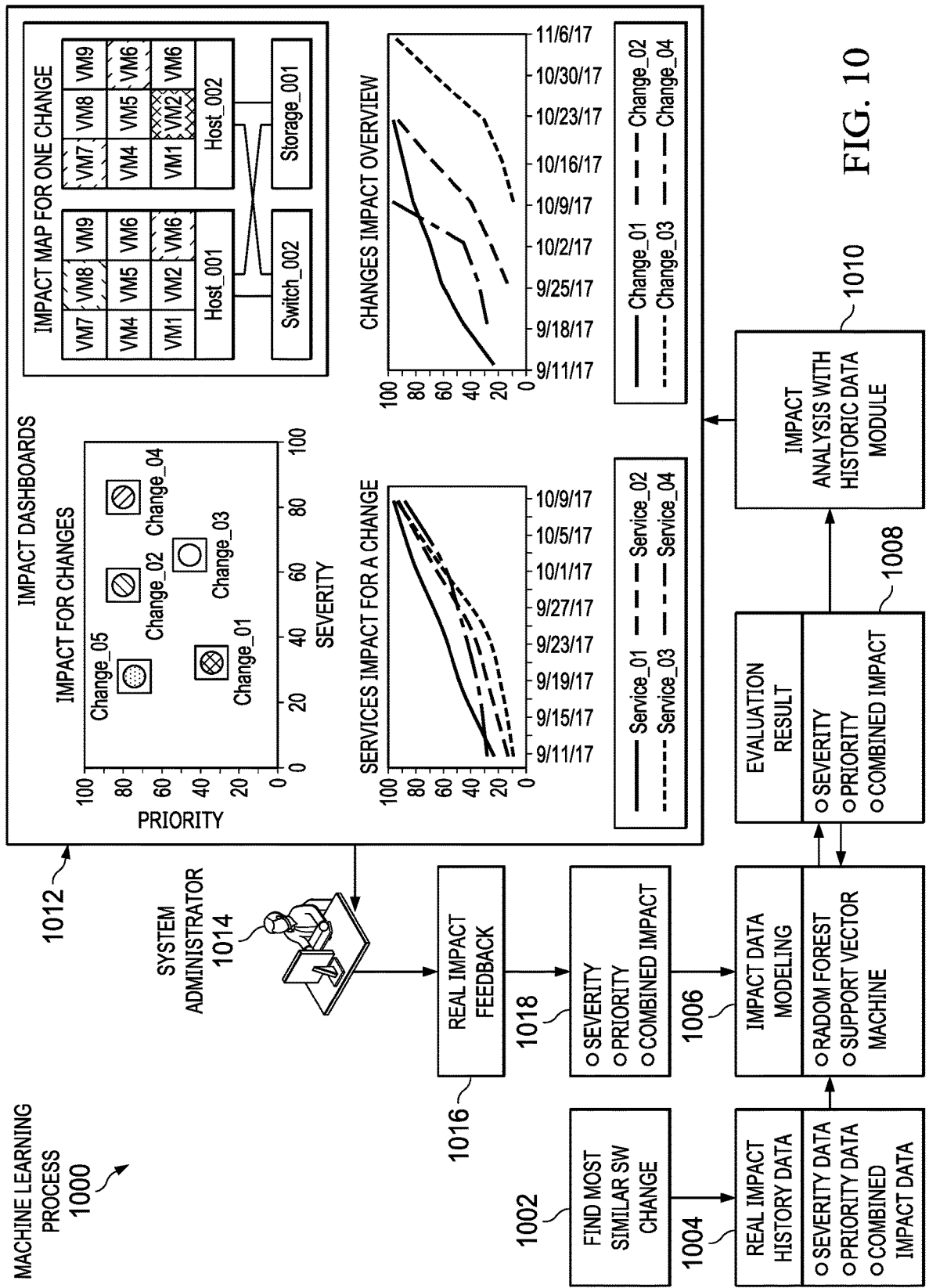
FIG. 10 is a diagram illustrating a machine learning process in accordance with an illustrative embodiment.

With reference now to FIG. 10, a diagram illustrating a machine learning process is depicted in accordance with an illustrative embodiment. Illustrative embodiments utilize machine learning process 1000 to optimize and refine an impact evaluation model, such as impact evaluation model 230 in FIG. 2 and impact evaluation model 518 in FIG. 5, over time based on historical data analysis and user feedback.

When a new software change comes up for implementation, illustrative embodiments at 1002 find the most similar software change in real impact history data 1004 and feeds this data into impact data modeling 1006 with a Radom Forest or a Support Vector Machine algorithm to generate evaluation result 1008 with severity, priority, and combined impact. Then, impact analysis with historic data module 1010, such as, for example, impact analysis with historic data module 524 in FIG. 5, generates impact dashboards 1012. In this example, impact dashboards 1012 includes a plurality of different dashboards, such as a changes impact overview dashboard, an impact for changes dashboard, an impact map for one change dashboard, and a services impacted for a change dashboard, for system administrator 1014 review. When the software change is implemented on one or more target services, system administrator 1014 provides real impact feedback 1016 (i.e., severity, priority, and combined impact 1018) corresponding to the software change to impact data modeling 1006 for refinement and optimization of the impact evaluation model.

Figure 11:
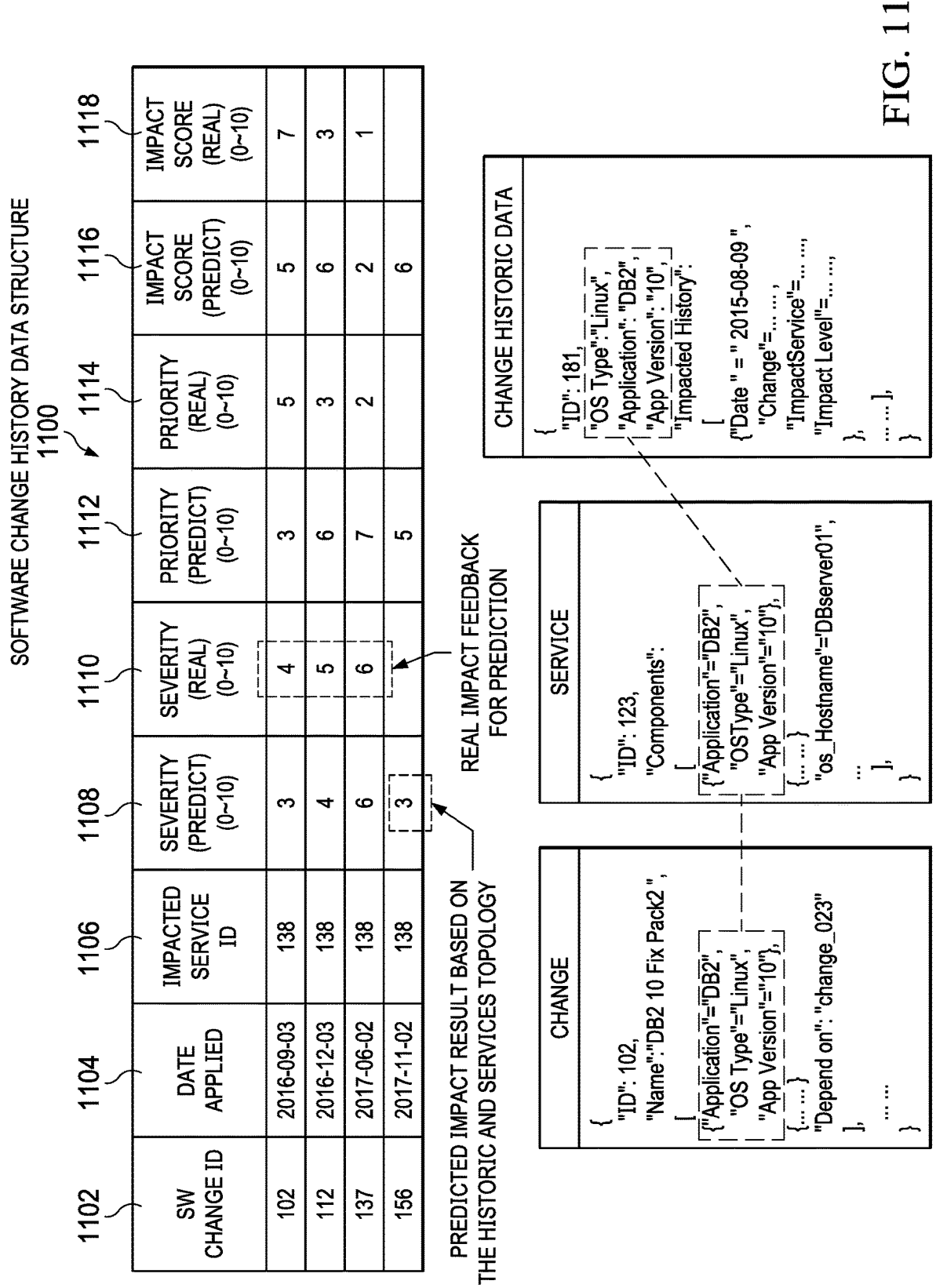
FIG. 11 is a diagram illustrating a software change history data structure in accordance with an illustrative embodiment.

With reference now to FIG. 11, a diagram illustrating a software change history data structure is depicted in accordance with an illustrative embodiment. Software change history data structure 1100 records and stores historic predicted and real impact data corresponding to previously implemented software changes on components of different cloud services. In this example, software change history data structure 1100 includes software change identifier 1102, date applied 1104, impacted service identifier 1106, predicted severity 1108, real severity 1110, predicted priority 1112, real priority 1114, predicted impact score 1116, and real impact score 1118. The value for predicted severity 1108 is based on recorded historic data and service topology. The value for real severity 1110 is received as feedback from a system administrator and is input into the real severity column for impact evaluation model training and optimization via machine learning.

Figure 12A:
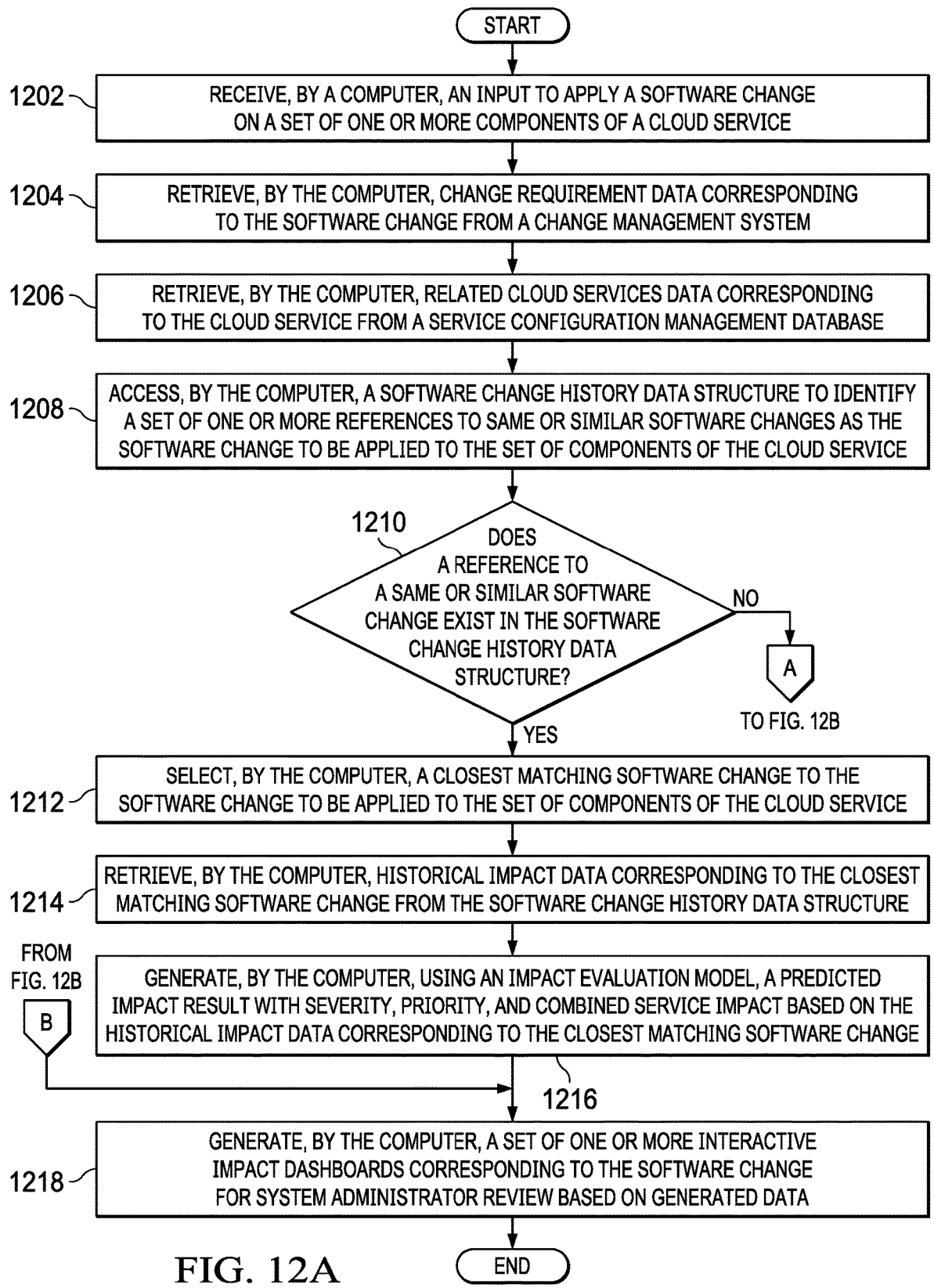
FIGS. 12A-12B are a flowchart illustrating a process for analyzing software change impact in accordance with an illustrative embodiment.
Figure 12B:
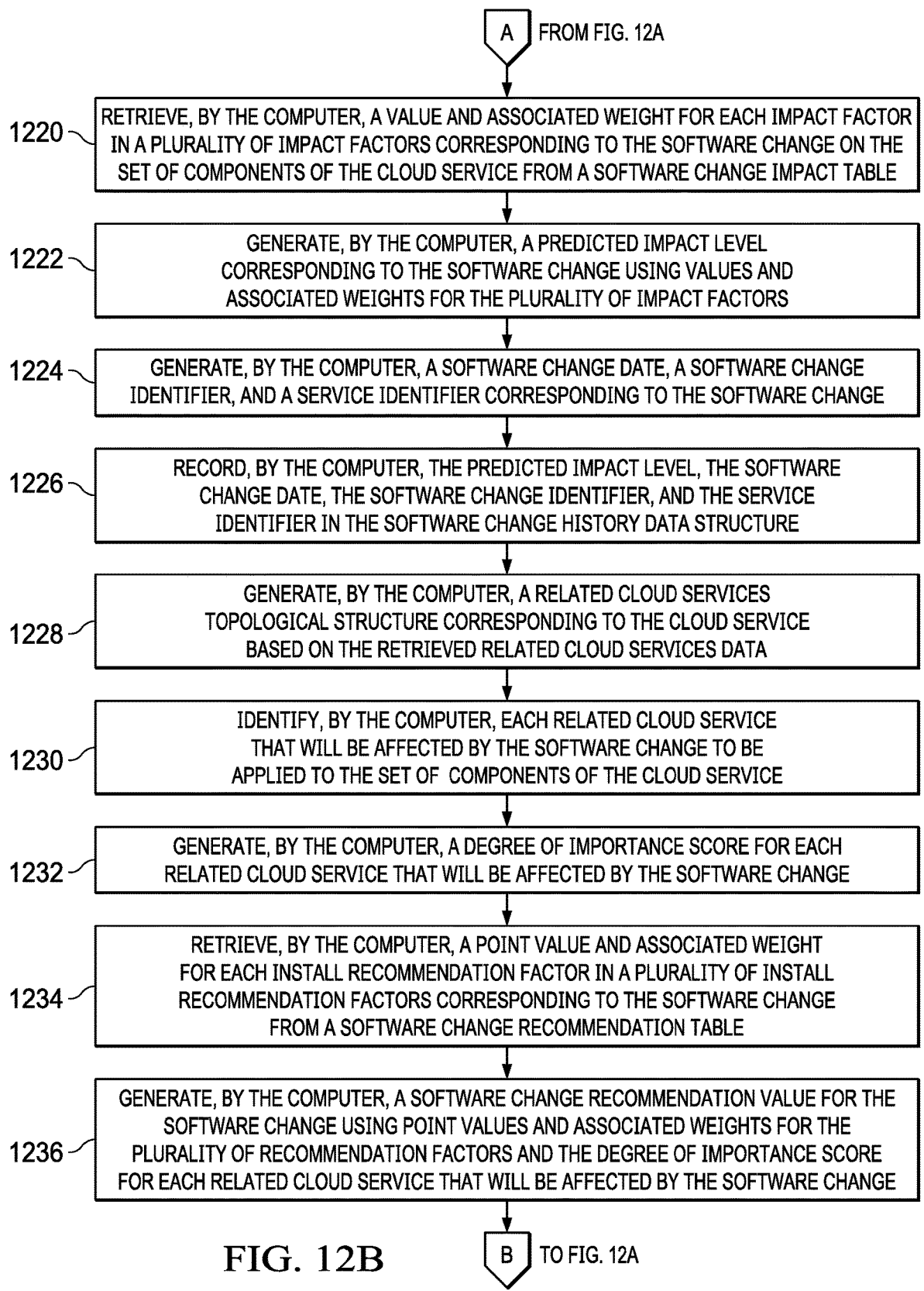

With reference now to FIGS. 12A-12B, a flowchart illustrating a process for analyzing software change impact is shown in accordance with an illustrative embodiment. The process shown in FIGS. 12A-12B may be implemented in a computer, such as server 106 in FIG. 1, data processing system 200 in FIG. 2, a cloud computing node in cloud computing nodes 310 in FIG. 3, or server 502 in FIG. 5.

The process begins when the computer receives an input to apply a software change on a set of one or more components of a cloud service (step 1202). Afterward, the computer retrieves change requirement data corresponding to the software change from a change management system (step 1204). The change requirement data may be, for example, manually input a user, such as a system administrator, or automatically generated by the computer. In addition, the computer retrieves related cloud services data corresponding to the cloud service from a service configuration management database (step 1206). Further, the computer accesses a software change history data structure to identify a set of one or more references to same or similar software changes as the software change to be applied to the set of components of the cloud service (step 1208).

Afterward, the computer makes a determination as to whether a reference to a same or similar software change exists in the software change history data structure (step 1210). If the computer determines that a reference to a same or similar software change does exist in the software change history data structure, yes output of step 1210, then the computer selects a closest matching software change to the software change to be applied to the set of components of the cloud service (step 1212). In addition, the computer retrieves historical impact data corresponding to the closest matching software change from the software change history data structure (step 1214). Further, the computer, using an impact evaluation model, generates a predicted impact result with severity, priority, and combined service impact based on the historical impact data corresponding to the closest matching software change (step 1216). Furthermore, the computer generates a set of one or more interactive impact dashboards corresponding to the software change for system administrator review and possible feedback based on the generated data (step 1218). Thereafter, the process terminates.

Returning again to step 1210, if the computer determines that a reference to a same or similar software change does not exist in the software change history data structure, no output of step 1210, then the computer retrieves a value and associated weight for each impact factor in a plurality of impact factors corresponding to the software change on the set of components of the cloud service from a software change impact table (step 1220). The computer generates a predicted impact level corresponding to the software change using values and associated weights for the plurality of impact factors (step 1222). In addition, the computer generates a software change date, a software change identifier, and a service identifier corresponding to the software change (step 1224).

The computer records the predicted impact level, the software change date, the software change identifier, and the service identifier in the software change history data structure (step 1226). Further, the computer generates a related cloud services topological structure corresponding to the cloud service based on the retrieved related cloud services data (step 1228). Furthermore, the computer identifies each related cloud service that will be affected by the software change to be applied to the set of components of the cloud service (step 1230).

The computer generates a degree of importance score for each related cloud service that will be affected by the software change (step 1232). Moreover, the computer retrieves a point value and associated weight for each install recommendation factor in a plurality of install recommendation factors corresponding to the software change from a software change recommendation table (step 1234). Afterward, the computer generates a software change recommendation value for the software change using point values and associated weights for the plurality of recommendation factors and the degree of importance score for each related cloud service that will be affected by the software change (step 1236). Thereafter, the process returns to step 1218 where the computer generates a set of one or more interactive impact dashboards corresponding to the software change for system administrator review and possible feedback based on the generated data.

Figure 13:
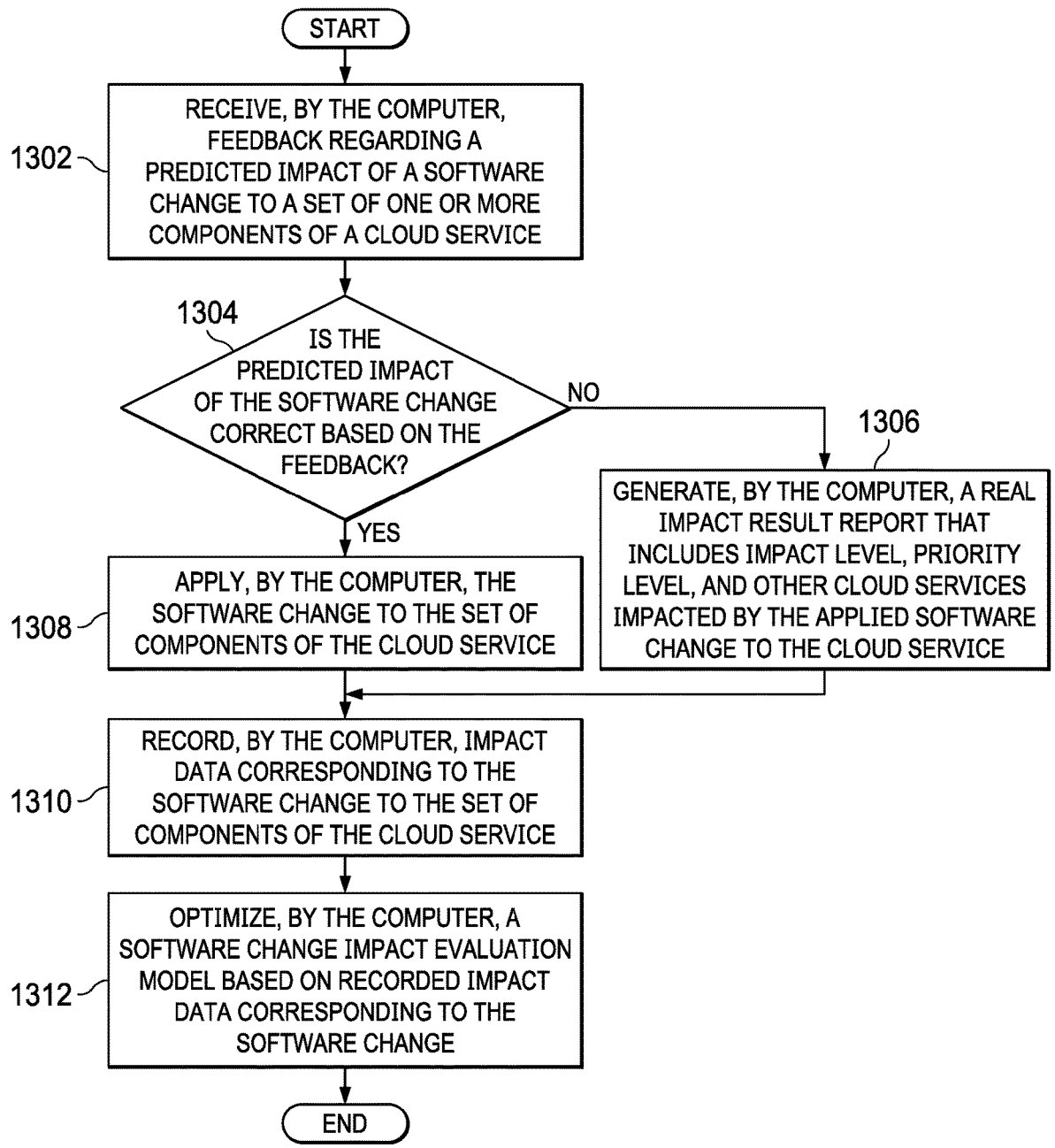
FIG. 13 is a flowchart illustrating a process for optimizing a software change impact evaluation model in accordance with an illustrative embodiment.

With reference now to FIG. 13, a flowchart illustrating a process for optimizing a software change impact evaluation model is shown in accordance with an illustrative embodiment. The process shown in FIG. 13 may be implemented in a computer, such as server 106 in FIG. 1, data processing system 200 in FIG. 2, a cloud computing node in cloud computing nodes 310 in FIG. 3, or server 502 in FIG. 5.

The process begins when the computer receives feedback regarding a predicted impact of a software change to a set of one or more components of a cloud service (step 1302). The feedback may be, for example, manually input by a user, such as a system administrator, or automatically generated by the computer. Afterward, the computer makes a determination as to whether the predicted impact of the software change is correct based on the feedback (step 1304).

If the computer determines that the predicted impact of the software change is incorrect based on the feedback, no output of step 1304, then the computer generates a real impact result report that includes impact level, priority level, and other cloud services impacted by the applied software change to the cloud service (step 1306) and the process proceeds to step 1310 thereafter. If the computer determines that the predicted impact of the software change is correct based on the feedback, yes output of step 1304, then the computer automatically applies the software change to the set of components of the cloud service (step 1308) increasing performance of the cloud service and the server providing the cloud service.

The computer records impact data corresponding to the software change to the set of components of the cloud service (step 1310). The computer records the impact data corresponding to the software change in a software change history data structure. Moreover, the computer optimizes a software change impact evaluation model based on recorded impact data corresponding to the software change (step 1312). The computer optimizes the software change impact evaluation model using machine learning. Thereafter, the process terminates.

Thus, illustrative embodiments of the present invention provide a computer-implemented method, computer system, and computer program product for analyzing impact of a software change on a set of one or more components of a cloud service and related services based on machine learning. Illustrative embodiments perform software change impact analysis for a cloud service by analyzing software change components, component change relationships with other services, component change dependencies with other components in the service, component change impact on applications of the service, and component change failure rate to calculate the impact on the cloud service. In addition, illustrative embodiments perform software change impact on other related cloud services by analyzing points and associated weights of different install recommendation factors, such as compliance, emergency, importance, relevance, and impact level for each of the other cloud services affected by the software change. Further, illustrative embodiments perform software change impact analysis based on machine learning by using severity data, priority data, and combined impact data. As a result, illustrative embodiments make the software change impact analysis more relevant, efficient, and accurate by using machine learning. Consequently, illustrative embodiments may assist cloud service providers in determining whether to apply a particular software change or when to apply the software change.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for analyzing software change impact, the computer-implemented method comprising:
   receiving, by a computer, an input to apply a software change on a set of components of a service provided to registered clients by a cloud computing platform;
   generating, by the computer using a software change impact evaluation model, a predicted impact of the software change on the set of components of the service;
   receiving, by the computer, feedback regarding the predicted impact of the software change to the set of components of the service;
   determining, by the computer, whether the predicted impact of the software change is correct based on the feedback;
   responsive to the computer determining that the predicted impact of the software change is correct based on the feedback, applying, by the computer, the software change to the set of components of the service increasing performance of the service and a server computer hosting the service;
   recording, by the computer, impact data corresponding to the software change to the set of components of the service, wherein the impact data comprises at least one of (i) component dependencies that represent a set of one or more dependencies that a component of the service directly affected by the software change has with other components of the service, (ii) a component importance that represents a level of importance of the component of the service directly affected by the software change, (iii) a component relationship with other cloud services that represents one or more relationships that the component of the service directly affected by the software change has with one or more of the other cloud services, (iv) a component failure rate that represents a rate of failure associated with the component of the service directly affected by the software change, and (v) a component impact on applications in the service that represents an impact of the component of the service directly affected by the software change on the applications in the service;
   optimizing, by the computer, using machine learning, the software change impact evaluation model based on the recorded impact data corresponding to the software change on the set of components of the service;
   accessing, by the computer, a software change history data structure to identify references to same or similar software changes as the software change to be applied to the set of components of the service;
   determining, by the computer, whether a reference to a same or similar software change exists in the software change history data structure;
   responsive to the computer determining that a reference to a same or similar software change does not exist in the software change history data structure, retrieving, by the computer, a value and associated weight for each impact factor in a plurality of impact factors corresponding to the software change on the set of components of the service from a software change impact table;
   generating, by the computer, the predicted impact corresponding to the software change using values and associated weights for the plurality of impact factors;
   generating, by the computer, a software change date, a software change identifier, and a service identifier corresponding to the software change; and
   recording, by the computer, the predicted impact, the software change date, the software change identifier, and the service identifier corresponding to the software change in the software change history data structure.

2. The computer-implemented method of claim 1 further comprising:
   responsive to the computer determining that the predicted impact of the software change is correct based on the feedback, generating, by the computer, a real impact result report corresponding to the software change that includes impact level, priority level, and other services impacted by the software change applied to the service; and
   providing real impact feedback corresponding to the software change to the software change impact evaluation model for refinement and optimization of the software change impact evaluation model.

3. The computer-implemented method of claim 1 further comprising:
responsive to the computer determining that a reference to a same or similar software change does exist in the software change history data structure, selecting, by the computer, a closest matching software change to the software change to be applied to the set of components of the service;
retrieving, by the computer, historical impact data corresponding to the closest matching software change from the software change history data structure; and
generating, by the computer, using an impact evaluation model, the predicted impact with severity, priority, and combined service impact based on the historical impact data corresponding to the closest matching software change.

4. The computer-implemented method of claim 1, wherein the plurality of impact factors includes component dependencies, component importance, component relationship with other services provided by the cloud computing platform, component failure rate, and component impact on applications in the service.

5. The computer-implemented method of claim 1 further comprising:
generating, by the computer, a related services topological structure corresponding to the service based on retrieved related services data;
identifying, by the computer, each related service that will be affected by the software change to be applied to the set of components of the service; and
generating, by the computer, a degree of importance score for each related service that will be affected by the software change to be applied to the set of components of the service.

6. The computer-implemented method of claim 5 further comprising:
retrieving, by the computer, a point value and associated weight for each install recommendation factor in a plurality of install recommendation factors corresponding to the software change from a software change recommendation table; and
generating, by the computer, a software change recommendation value for the software change using point values and associated weights for the plurality of recommendation factors and the degree of importance score for each related service that will be affected by the software change to be applied to the set of components of the service.

7. The computer-implemented method of claim 6, wherein the plurality of install recommendation factors include compliance, emergency, importance, relevance, and impact level.

8. The computer-implemented method of claim 2 further comprising:
generating, by the computer responsive to the computer determining that the predicted impact of the software change is correct based on the feedback, a set of impact dashboards corresponding to the software change on the set of components of the service for system administrator review and feedback, wherein the service is a cloud service provided by the cloud computing platform.

9. The computer-implemented method of claim 1 further comprising:

comparing, by the computer, the predicted impact result with a real impact result of the software change to determine whether the predicted impact result is accurate.

10. The computer-implemented method of claim 5 further comprising:
retrieving, by the computer, change data corresponding to the software change from a change management system; and
retrieving, by the computer, related services data corresponding to the service from a service configuration management database, wherein the related services data retrieved from the service configuration management database identify relationships between different cloud services of the cloud computing platform.

11. A computer system for analyzing software change impact, the computer system comprising:
a bus system;
a storage device connected to the bus system, wherein the storage device stores program instructions; and
a processor connected to the bus system, wherein the processor executes the program instructions to:
receive an input to apply a software change on a set of components of a service provided to registered clients by a cloud computing platform;
generate a predicted impact of the software change on the set of components of the service using a software change impact evaluation model;
receive feedback regarding the predicted impact of the software change to the set of components of the service;
determine whether the predicted impact of the software change is correct based on the feedback;
apply the software change to the set of components of the service increasing performance of the service and a server computer hosting the service in response to determining that the predicted impact of the software change is correct based on the feedback;
record impact data corresponding to the software change to the set of components of the service, wherein the impact data comprises at least one of (i) component dependencies that represent a set of one or more dependencies that a component of the service directly affected by the software change has with other components of the service, (ii) a component importance that represents a level of importance of the component of the service directly affected by the software change, (iii) a component relationship with other cloud services that represents one or more relationships that the component of the service directly affected by the software change has with one or more of the other cloud services, (iv) a component failure rate that represents a rate of failure associated with the component of the service directly affected by the software change, and (v) a component impact on applications in the service that represents an impact of the component of the service directly affected by the software change on the applications in the service;
optimize, using machine learning, the software change impact evaluation model based on the recorded impact data corresponding to the software change on the set of components of the service;
access a software change history data structure to identify references to same or similar software changes as the software change to be applied to the set of components of the service;

determine whether a reference to a same or similar software change exists in the software change history data structure;

retrieve a value and associated weight for each impact factor in a plurality of impact factors corresponding to the software change on the set of components of the service from a software change impact table responsive to determining that a reference to a same or similar software change does not exist in the software change history data structure;

generate the predicted impact corresponding to the software change using values and associated weights for the plurality of impact factors;

generate a software change date, a software change identifier, and a service identifier corresponding to the software change; and record the predicted impact, the software change date, the software change identifier, and the service identifier corresponding to the software change in the software change history data structure.

12. The computer system of claim 11, wherein the processor further executes the program instructions to:

generate a real impact result report that includes impact level, priority level, and other services impacted by the software change applied to the service in response to determining that the predicted impact of the software change is correct based on the feedback; and providing real impact feedback corresponding to the software change to the software change impact evaluation model for refinement and optimization of the software change impact evaluation model.

13. The computer system of claim 11, further comprising:

retrieve change data corresponding to the software change from a change management system; and retrieve related services data corresponding to the service from a service configuration management database, wherein the related services data retrieved from the service configuration management database identify relationships between different cloud services of the cloud computing platform.

14. A computer program product for analyzing software change impact, the computer program product comprising a computer readable storage medium having program instructions embodied therewith, the program instructions executable by a computer to cause the computer to perform a method comprising:

receiving, by a computer, an input to apply a software change on a set of components of a service provided to registered clients by a cloud computing platform; generating a predicted impact of the software change on the set of components of the service using a software change impact evaluation model;

receiving, by the computer, feedback regarding the predicted impact of the software change to the set of components of the service;

determining, by the computer, whether the predicted impact of the software change is correct based on the feedback;

responsive to the computer determining that the predicted impact of the software change is correct based on the feedback, applying, by the computer, the software change to the set of components of the service increasing performance of the service and a server computer hosting the service;

recording, by the computer, impact data corresponding to the software change to the set of components of the service, wherein the impact data comprises at least one of (i) component dependencies that represent a set of one or more dependencies that a component of the service directly affected by the software change has with other components of the service, (ii) a component importance that represents a level of importance of the component of the service directly affected by the software change, (iii) a component relationship with other cloud services that represents one or more relationships that the component of the service directly affected by the software change has with one or more of the other cloud services, (iv) a component failure rate that represents a rate of failure associated with the component of the service directly affected by the software change, and (v) a component impact on applications in the service that represents an impact of the component of the service directly affected by the software change on the applications in the service;

optimizing, by the computer, using machine learning, the software change impact evaluation model based on the recorded impact data corresponding to the software change on the set of components of the service;

accessing, by the computer, a software change history data structure to identify references to same or similar software changes as the software change to be applied to the set of components of the service;

determining, by the computer, whether a reference to a same or similar software change exists in the software change history data structure;

responsive to the computer determining that a reference to a same or similar software change does not exist in the software change history data structure, retrieving, by the computer, a value and associated weight for each impact factor in a plurality of impact factors corresponding to the software change on the set of components of the service from a software change impact table;

generating, by the computer, the predicted impact corresponding to the software change using values and associated weights for the plurality of impact factors;

generating, by the computer, a software change date, a software change identifier, and a service identifier corresponding to the software change; and recording, by the computer, the predicted impact, the software change date, the software change identifier, and the service identifier corresponding to the software change in the software change history data structure.

15. The computer program product of claim 14 further comprising:

responsive to the computer determining that the predicted impact of the software change is correct based on the feedback, generating, by the computer, a real impact result report that includes impact level, priority level, and other services impacted by the software change applied to the service; and providing real impact feedback corresponding to the software change to the software change impact evaluation model for refinement and optimization of the software change impact evaluation model.

16. The computer program product of claim 14 further comprising:

accessing, by the computer, a software change history data structure to identify references to same or similar software changes as the software change to be applied to the set of components of the service; and determining, by the computer, whether a reference to a same or similar software change exists in the software change history data structure.

17. The computer program product of claim 16 further comprising:
- responsive to the computer determining that a reference to a same or similar software change does exist in the software change history data structure, selecting, by the computer, a closest matching software change to the software change to be applied to the set of components of the service;
- retrieving, by the computer, historical impact data corresponding to the closest matching software change from the software change history data structure; and
- generating, by the computer, using an impact evaluation model, the predicted impact with severity, priority, and combined service impact based on the historical impact data corresponding to the closest matching software change.

18. The computer program product of claim 14 further comprising:
- retrieving, by the computer, change data corresponding to the software change from a change management system; and
- retrieving, by the computer, related services data corresponding to the service from a service configuration management database, wherein the related services data retrieved from the service configuration management database identify relationships between different cloud services of the cloud computing platform.

\* \* \* \* \*